(12) United States Patent
Guidash (10) Patent No.: US 9,241,118 B2
(45) Date of Patent: Jan. 19, 2016

(54) HIGH FILL-FACTOR IMAGE SENSOR ARCHITECTURE

(71) Applicant: Rambus Inc., Sunnyvale, CA (US)

(72) Inventor: Michael Guidash, Rochester, NY (US)

(73) Assignee: Rambus Inc., Sunnyvale, CA (US)

( * ) Notice: Subject to any disclaimer, the term of this patent is extended or adjusted under 35 U.S.C. 154(b) by 163 days.

(21) Appl. No.: 14/094,077

(22) Filed: Dec. 2, 2013

(65) Prior Publication Data

US 2014/0158863 A1    Jun. 12, 2014

Related U.S. Application Data

(60) Provisional application No. 61/734,274, filed on Dec. 6, 2012.

(51) Int. Cl.
*H01L 27/00* (2006.01)
*H04N 5/353* (2011.01)
*H04N 5/355* (2011.01)
*H04N 5/3745* (2011.01)

(52) U.S. Cl.
CPC ............. *H04N 5/3535* (2013.01); *H04N 5/355* (2013.01); *H04N 5/3745* (2013.01)

(58) Field of Classification Search
CPC ..................................................... H04N 5/3745
USPC ....................................................... 250/208.1
See application file for complete search history.

(56) References Cited

U.S. PATENT DOCUMENTS 7,573,013 B2    8/2009  Choi et al.
2014/0263964 A1*  9/2014  Yang ................... H04N 5/37457
                                                       250/208.1

FOREIGN PATENT DOCUMENTS

WO    WO-2013-070932 A1    5/2013

* cited by examiner

*Primary Examiner* — Thanh Luu
(74) *Attorney, Agent, or Firm* — Fenwick & West LLP (57) ABSTRACT

An image sensor architecture is implemented within an image sensor system. Image sensor pixels include pixel regions, and each pixel region includes a photosensor, a reset circuit, and a readout circuit. The readout circuit receives enable signals from an enable signal line, and outputs a pixel signal representative of light captured by the photosensor on a combination input/output line. The reset circuit resets the photosensor in response to receiving a first reset signal on a reset line and a second reset signal on the combination input/output line.

19 Claims, 7 Drawing Sheets

HIGH FILL-FACTOR IMAGE SENSOR ARCHITECTURE

CROSS REFERENCE TO RELATED APPLICATIONS

This application claims the benefit of U.S. Provisional Application No. 61/734,274, filed Dec. 6, 2012, which is incorporated by reference in its entirety.

TECHNICAL FIELD

The present disclosure relates to the field of electronic image sensors, and more specifically to an image sensor architecture with a high fill-factor.

BACKGROUND

Digital image sensors, such as CMOS or CCD sensors, include a plurality of photosensors each configured to convert photons incident upon the photosensors ("captured light") into electric charge. The electric charge can then be converted into image data representing the light captured by each photosensor. The image data includes a digital representation of the captured light, and may be manipulated or processed to produce a digital image capable of display on a viewing device. Image sensors are implemented in integrated circuits ("ICs") with a physical surface that may be divided into a plurality of pixel regions (for instance, one or more photosensors and attendant control circuitry) configured to convert light into an electrical signal (charge, voltage, current, etc.). For convenience, pixel regions within an image sensor may also be referred to as image pixels ("IPs") and the aggregate of the pixel regions or image pixels will be referred to as the image sensor region. An image sensor IC typically will also include areas outside of the image sensor region, for example certain types of control or interface circuitry.

Image sensors include a variety of control lines, reset lines, and output lines (collectively "input/output" or "I/O" lines herein) to transmit control signals, reset signals, and image data to and from the pixels of the image sensor. As photosensors for most applications perform better with an unobstructed path for light incident upon the photosensors, the portions of the surface area of an image sensor dedicated to couple I/O lines to the pixels reduce the amount of image sensor surface area that can contain photosensors with unobstructed light paths. The proportion of image sensor surface area containing unobstructed photosensors is referred to herein as the "fill factor" of the image pixels.

BRIEF DESCRIPTION OF THE DRAWINGS

The various embodiments disclosed herein are illustrated by way of example, and not by way of limitation, in the figures of the accompanying drawings and in which like reference numerals refer to similar elements and in which.

DETAILED DESCRIPTION

In some image sensors, electrical information representing a photon response to light incident upon the pixel region (referred to herein as a "pixel signal") is output from a readout circuit within the image sensor region to a read circuit external to the image sensor region on a read circuit line. The read circuit can convert the pixel signal to a digital value, and can store and/or accumulate converted digital values over time. After receiving the pixel signal, the read circuit can provide a reset signal to a reset circuit within the image sensor region via the read circuit line. The reset signal is configured to reset the pixel signal at the pixel region. A control scheme can be implemented to prevent both the readout circuit and the read circuit from simultaneously driving the read circuit line. By allowing the read circuit line to be driven by either a circuit within the image sensor region or a circuit external the image sensor region (referred to herein as a "combination line"), the amount of the image sensor region obstructed by I/O lines is reduced, and the fill factor of the image pixels in the image sensor region is increased.

Image Sensor Overview

Figure 1:
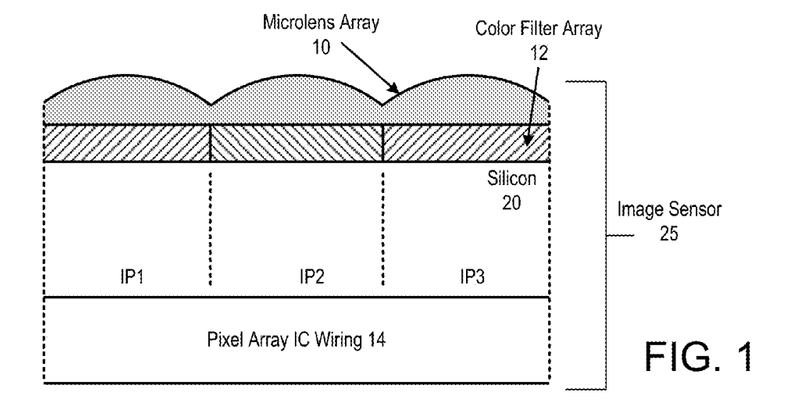
FIG. 1 illustrates a cross-section of a portion of an image sensor, according to one embodiment.

FIG. 1 illustrates a cross-section of a portion of an image sensor, according to one embodiment. In image sensor 25, light passing through a microlens array 10 and a color filter array 12 (useful for color imaging) is incident upon a silicon section 20 of the image sensor. The use of microlenses (or other concentrating optics) and color filters is optional and is shown here for illustrative purposes only. Silicon 20 contains photodiodes (not shown) to collect charge generated by photons absorbed by the silicon, and access transistors (also not shown) to operate the photodiodes. Pixel array IC wiring 14 provides connections used to route signals (such as control signals, enable signals, reset signals, and the like) and supply voltages within the array. As shown, image sensor 25 is a BackSide Illuminated (BSI) sensor because light enters the silicon from the side of the integrated circuit opposite the wiring layers and primary active circuit formation. Optionally, pixel array IC wiring 14 can be arranged between the color filter array 12 and silicon 20 (with primary active circuit formation within the "top" of the silicon as oriented in FIG. 1) for FrontSide Illumination (FSI).

The image sensor 25 includes a plurality of IPs ("image pixels"), IP1-IP3 shown, upon which light collected by the lenses of the microlens array 10 is respectively incident. Each IP includes one or more photodiodes embedded within the silicon 20. At least some photons entering silicon 20 are converted to electron-hole pairs in the silicon and the resulting electrons (or holes in alternate embodiments) are collected by the IPs, producing pixel signals. The description herein will refer to this process as the capture and conversion of light by the IPs into image data for the purposes of simplicity. Each IP of the image sensor represents a portion of the surface area of the image sensor, and the IPs of the image sensor may be organized into various arrays of columns and rows. In a CMOS image pixel technology, each IP converts light incident upon the IP into a charge and includes readout circuitry configured to convert the charge into a voltage or current. In one embodiment, the light captured by each IP of the image sensor represents one pixel of image data for an associated digital image, though in other embodiments image data from multiple IPs is combined to represent a fewer number (one or more) of pixels (downscaling). The one or more photodiodes or other light-capturing components within an IP are collectively referred to herein as the "photosensor" of the IP.

The image sensor 25 may include components outside the IP array. Similarly, portions of the IP array may include components that do not convert light into charge. The region defined by the IPs in the aggregate will be referred to as the image sensor region. As described herein, the image sensor may include amplifiers, analog-to-digital converters ("ADCs"), comparators, controllers, counters, accumulators, registers, transistors, photodiodes, and the like. In different architectures, some of these components may be located within the image sensor region or external to the image sensor region, and some components may be located on a companion integrated circuit. In these embodiments, a lens (such as those of the microlens array 10) may be configured to direct light toward the actual light-sensing elements within the IP rather than, for example, on the amplifiers, comparators, controllers, and other components.

As noted above, an image sensor may include an array of multiple IPs. Each IP, in response to light (for instance, one or more photons), captures and stores a corresponding charge. In one embodiment, upon the sampling of an IP by a read circuit, if a pixel signal representative of the charge stored at the IP exceeds a sampling threshold, the pixel signal is converted to a multiple-bit digital value representing the pixel signal (using, for example, an ADC) and the read circuit produces a reset signal configured to reset the charge stored by the IP. In alternative embodiments, upon the sampling of an IP, if a pixel signal representative of the charge stored at the IP exceeds an exposure threshold, the pixel is converted to a single-bit digital value (a "1") and the read circuit produces a reset signal configured to reset the charge stored by the IP. The IPs of such alternative embodiments are referred to herein as "binary pixels" or "BPs" herein. Determinations of whether the charge stored at the IP exceeds a sampling threshold or an exposure threshold can be made using a sense-amplifier ("SA") or other comparator. Upon a conversion of one or more pixel signals to digital values by a read circuit, the digital values can be accumulated and stored by the read circuit.

Figure 2:
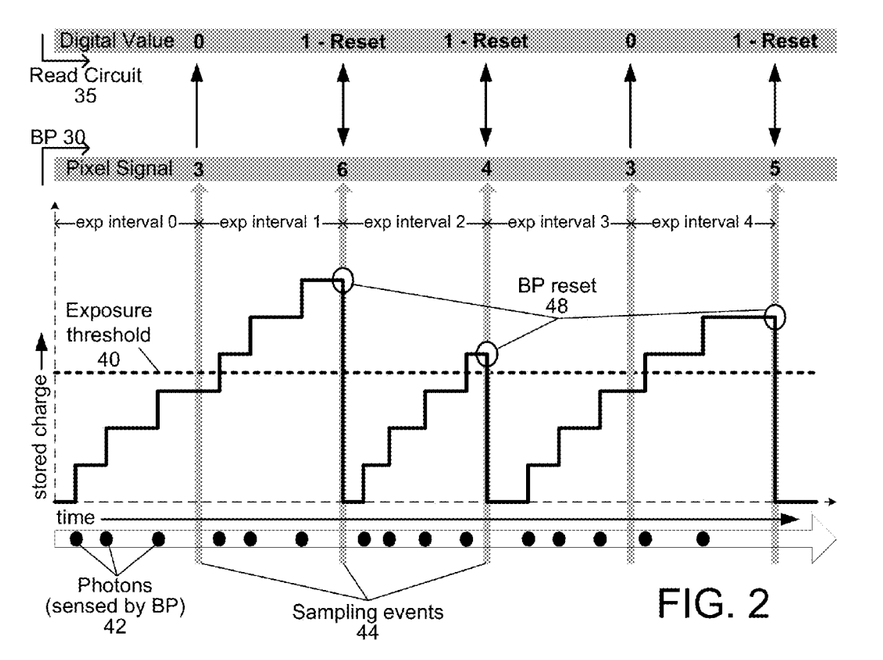
FIG. 2 illustrates an example sampling of photons incident upon a binary pixel having a sampling threshold corresponding to four photons in a synchronous environment according to one embodiment.

FIG. 2 illustrates an example sampling of photons incident upon a pixel having a sampling threshold corresponding to four photons in a synchronous environment according to one embodiment. Photons 42 sensed by a BP 30 (subject to quantum efficiency limitations, i.e., typically not every incident photon will result in a captured charge carrier), with an exposure threshold 40 representing a charge corresponding to four photons, cause the BP to convert the photons to charge. Each photon detected by the BP triggers a corresponding cumulative increase in the charge captured by the BP, shown as positive steps in the charge of FIG. 2 for the purposes of example. The BP is sampled at the sampling events 44, which, for example, may be implemented with a sampling clock signal. Although the BP of FIG. 2 is sampled periodically (resulting in even exposure intervals), in other embodiments the BP is sampled at uneven exposure intervals. For instance, if a light detector determines that the amount of light incident upon the image array increases, a sampling controller coupled to the light detector may decrease the length of the exposure intervals between sampling, and vice versa. It should also be noted that the exposure threshold may vary over time (for instance due to lighting conditions, change in saturation tolerance, to set the dynamic range, or the like), and does not necessarily represent a static threshold. Uneven sampling intervals within a captured frame may also be used to set the dynamic range of the device.

When sampled by a read circuit 35, the BP 30 is configured to output a pixel signal representative of the cumulative number of photons detected since the last BP reset. If the pixel signal exceeds the exposure threshold 40, the read circuit converts the pixel signal to a digital value of "1" (or uses an ADC to form a multibit digital value); stores, accumulates, or outputs the digital value, and provides a reset signal to the BP configured to reset the charge stored at the BP. If the pixel signal does not exceed the exposure threshold, the read circuit does not convert the pixel signal to a digital value and does not provide a reset signal to the BP. If the BP receives a reset signal from the read circuit, the BP resets or discharges the stored charge. If the BP does not receive a reset signal from the read circuit, the BP maintains the stored charge, and accumulates additional charge upon detecting additional photons. In the embodiment of FIG. 2, the read circuit includes an SA, ADC, or other comparator for comparing received pixel signals representative of charge stored at the BP.

The embodiment of FIG. 2 illustrates five exposure intervals. During exposure interval 0, the BP 30 senses three photons. As the charge captured by the BP as a result of these three photon strikes does not exceed the exposure threshold 40, the read circuit 35, upon sampling the BP, will not convert the pixel signal representing the three photons into a digital value and will not output a reset signal to the BP. Accordingly, charge accumulation continues. During exposure interval 1, three additional photon strikes cause the BP to capture additional charge in excess of the exposure threshold. The read circuit, upon sampling the BP at the sampling event immediately following exposure interview 1, will convert the pixel signal representing the six photons detected over the course of exposure interval 0 and exposure interval 1 into a digital value, and will output a reset signal to the BP. The BP, in response to receiving the reset signal, will reset or discharge the stored charge at the BP. During exposure interval 2, four photon strikes cause the BP to again capture charge in excess of the exposure threshold, resulting in a conversion of the pixel signal representative of the four photons into a digital value by the read circuit, and the providing of a reset signal from the read circuit to the BP. Upon receiving the reset signal, the charge stored by the BP is again reset. During exposure interval 3, three photon strikes cause the BP to capture a charge that does not exceed the exposure threshold, and the read circuit does not convert the pixel signal representative of the three photons or provide a reset circuit to the BP. During exposure interval 4, two photon strikes cause the BP to capture additional charge so as to exceed the exposure threshold, and the read circuit converts the pixel signal representative of the 5 photons into a digital value and outputs a reset circuit to the BP. The resetting of the BP is illustrated by the BP reset times 48 in FIG. 2. It should be noted that in operation, any number of exposure intervals (for instance, the five exposure intervals of the embodiment of FIG. 2 or more) may occur during the capture of a single image or video frame or sub-frame. Optionally, at the end of the capture of an image, frame, or sub-frame the charge stored by the BP may be reset despite not exceeding the exposure threshold.

It can be seen in the embodiment of FIG. 2 that the effective integration intervals (the intervals between successive sampling outputs that exceed the exposure threshold) vary in duration according to the photon flux, extending from a minimum time corresponding to a single exposure interval to a maximum time corresponding to the total number of exposure intervals per image frame period. The number of BP sampling intervals determines the degree of temporal oversampling within a given image frame period, and the variable effective integration interval allows different BPs to respond to different arrival rates in the same frame. BPs, BP sampling, and BP image sensors are discussed in greater detail in co-pending application number PCT/US12/064,177, entitled "Conditional reset, temporally oversampled binary pixel image sensor", filed on Nov. 8, 2012, the contents of which are hereby incorporated by reference.

Figure 3:
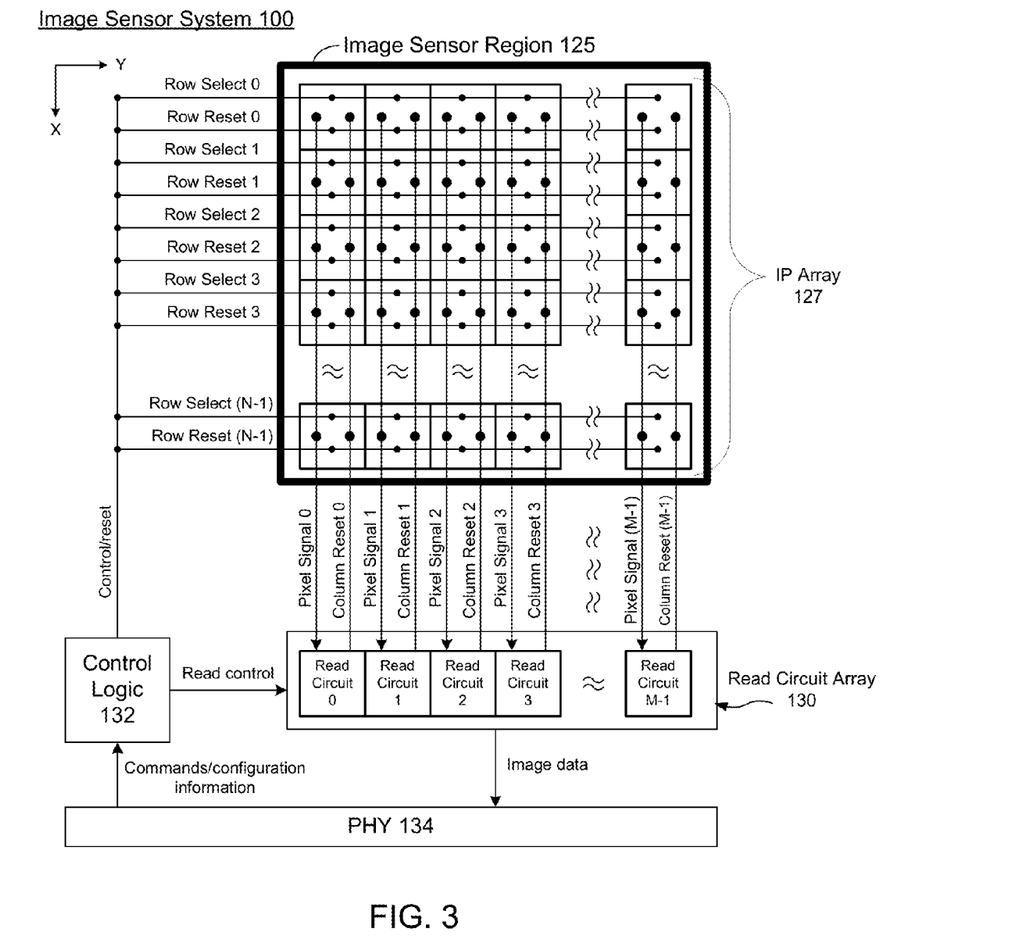
FIG. 3 illustrates an example embodiment of an image sensor system according to one embodiment.

FIG. 3 illustrates an example embodiment of an image sensor system according to one embodiment. The image sensor system 100 of FIG. 3 includes an image sensor region 125, a read circuit array 130, control logic 132, and a physical signaling interface 134. In other embodiments, the image sensor system may include fewer, additional, or different components than illustrated in the embodiment of FIG. 3 (for instance, the circuit may have memory integrated therewith). The image sensor system shown in FIG. 3 can be implemented as a single IC, or can be implemented as multiple ICs (for instance, the image sensor region and the read circuit array can be located on separate ICs). Further, various components (such as the read circuit array, the control logic, and the physical signaling interface) can be integrated within the image sensor region 125.

For purposes of example, the image sensor system 100 and a host IC (not shown in FIG. 3) communicatively coupled to the image sensor system are assumed to form the primary image acquisition components within a camera (e.g., a still-image or video camera within a mobile device, compact camera, digital SLR camera, stand-alone or platform-integrated webcam, high-definition video camera, security camera, automotive camera, etc.). The image sensor IC and host IC can be more generally deployed alone or together with like or different imaging components within virtually any imaging system or device including without limitation metrology instruments, medical instruments, gaming systems or other consumer electronics devices, military and industrial imaging systems, transportation-related systems, space-based imaging systems and so forth. Operation of the image sensor system generally involves the capture of an image or frame through the exposure of IPs to light, the conversion of stored charge as a result of the exposure into image data, and the outputting of the image data to a storage medium.

The image sensor region 125 includes an IP array 127 including N-rows (indexed from 0 to N−1) and M-columns (indexed from 0 to M−1). In one embodiment, the IPs in the IP array are BPs, operating as illustrated in FIG. 2. The physical signaling interface 134 is configured to receive commands and configuration information from a host IC (e.g., a general-purpose or special-purpose processor, application-specific integrated circuit (ASIC) or any other control component configured to control the image sensor IC), and is configured to provide the received commands and configuration information to the control logic 132. The physical signaling interface is also configured to receive image data from the read circuit array 130 and to output received image data to the host IC.

The control logic 132 is configured to receive commands and configuration information from the physical signaling interface 134, and is configured to transmit signals configured to manipulate the operations and functionality of the image sensor system 100. For example, in response to receiving a command to capture an image or frame, the control logic may output a series of exposure signals on row exposure lines (not shown in FIG. 3) configured to cause IPs to begin capturing light, a series of select signals on the row select bus of FIG. 3 configured to cause IPs to output pixel values to a read circuit in the read circuit array 130, and a series of row reset signals on the row reset bus of FIG. 3 configured to cause one or more of the IPs to reset in accordance with co-supplied column reset signals. As illustrated in the embodiment of FIG. 3, each row select bus and row reset bus include a plurality of row select lines and row reset lines, with each row select line and row reset line pair coupled to the IPs in an IP array row. It should be noted that the control logic is shown in FIG. 3 as external to the image sensor region 125, but as noted above, all or portions of the control logic may be implemented locally within the image sensor region.

The read circuit array 130 includes M read circuits, each configured to receive pixel signals from a column of IPs in the IP array 127. It should be noted that in other embodiments not described further herein, the read circuit array can include multiple read circuits configured to receive pixel signals from respective portions of each IP column. Similarly, in other embodiments, each read circuit can be coupled to one or more IPs in the IP array not necessarily belonging to the same IP column. A pixel signal bus couples the IPs in each IP column in the IP array to the read circuit associated with the IP column within the read circuit array. Each pixel signal bus includes at least one pixel signal line coupled to each IP in an IP column associated with the pixel signal bus. Each IP is configured to output a pixel signal produced by the IP to the pixel signal bus, and each read circuit is configured to sample the pixel signals from the IPs in the IP column associated with the read circuit. For example, read circuit 0 is configured to sample pixel signals from pixel signal bus 0, and so forth. Each read circuit in the read circuit array can sample pixel signals iteratively from IPs in the IP column associated with the read circuit (for instance, by sampling pixel signals from successive IPs in order over multiple passes), or can sample pixel signals according to a pre-determined non-sequential order. In one embodiment, read circuits can sample multiple pixel signals simultaneously. Although not illustrated in the embodiment of FIG. 3, the read circuits can additionally include memories configured to store accumulated digital values prior to outputting the accumulated values as image data.

A column reset bus couples the IPs in each IP column in the IP array 127 to the read circuit(s) associated with each IP column. Each column reset bus includes at least one column reset line, with a column reset line coupled to each IP in an IP column associated with the column reset bus. After sampling a pixel signal from an IP in an IP column, the read circuit associated with the IP column can conditionally produce a column reset signal based on the results of the sampling. For example, if an IP in an IP column outputs a pixel signal to a read circuit associated with the IP column via the pixel signal bus coupling the IP to the read circuit, and if the read circuit determines that the pixel signal exceeds a sampling threshold, the read circuit outputs a column reset signal to the IP via the column reset bus coupling the read circuit to the IP. Upon receiving a column reset signal, an IP can reset the charge stored at the IP, though in one embodiment, the IP can only reset the charge stored at the IP upon receiving a row reset signal and a concurrent column reset signal.

The control logic 132 produces read control signals for the read circuits in the read circuit array 130. The read control signals can control the sampling of pixel signals from the IPs in the IP array 127 by the read circuits, the comparison of sampled pixel signals to sampling thresholds or exposure thresholds, the conversion of sampled pixel signals into digital values, the accumulation of the digital values, the outputting of the accumulated digital values, the production of column reset signals, and the resetting of the accumulators. The read control signals can include a references signal, a sample signal, a compare signal, a readout signal (for accumulators in the read circuits), and reset/accumulate signals for the accumulators in each read circuit in the read circuit array as described in FIG. 3.

The control logic 132 is configured to produce read control signals for the read circuit array 130 to enable the capture of an image over an image capture period. Prior to the image capture period or at the first use of a particular IP memory location for an image capture period, the control logic can produce a reset to cause the accumulator of each read circuit 110 to reset the IP memory location. At the beginning of the image capture period, the control logic can produce a threshold signal for each of the read circuits; the threshold signal can be used by each read circuit to determine a threshold to which pixel signals are compared for the purposes of producing conditional column reset signals for the IPs associated with the sampled pixel signals, and for the purposes of accumulating digital values associated with the pixel signals. During the image capture period, the control logic can produce a series of sample signals configured to enable the read circuits to sample pixel signals from IPs associated with the read circuits. At the end of the image capture period, the controlled logic can produce a residue signal configured to enable each read circuit to output a pixel signal for accumulation regardless of whether the pixel signal exceeds a sampling threshold. After the image capture period, the control logic produces a readout signal configured to enable each read circuit to output the accumulated digital values representative of sampled pixel signals as image data. The control logic may also produce a reset signal after each image capture period to reset the accumulated digital values within each read circuit.

The control logic may also be configured to produce pause and resume signals configured to cause the IPs and the read circuits to pause and resume an image capture, and to produce any other signal necessary to control the functionality of the IPs and read circuits in the read circuit array. For each read circuit, the image data output by the read circuit is a digital representation of the light captured by each IP in an IP column associated with the read circuit. The image data is received by the physical signaling interface for subsequent output to a host IC.

Figure 4A:
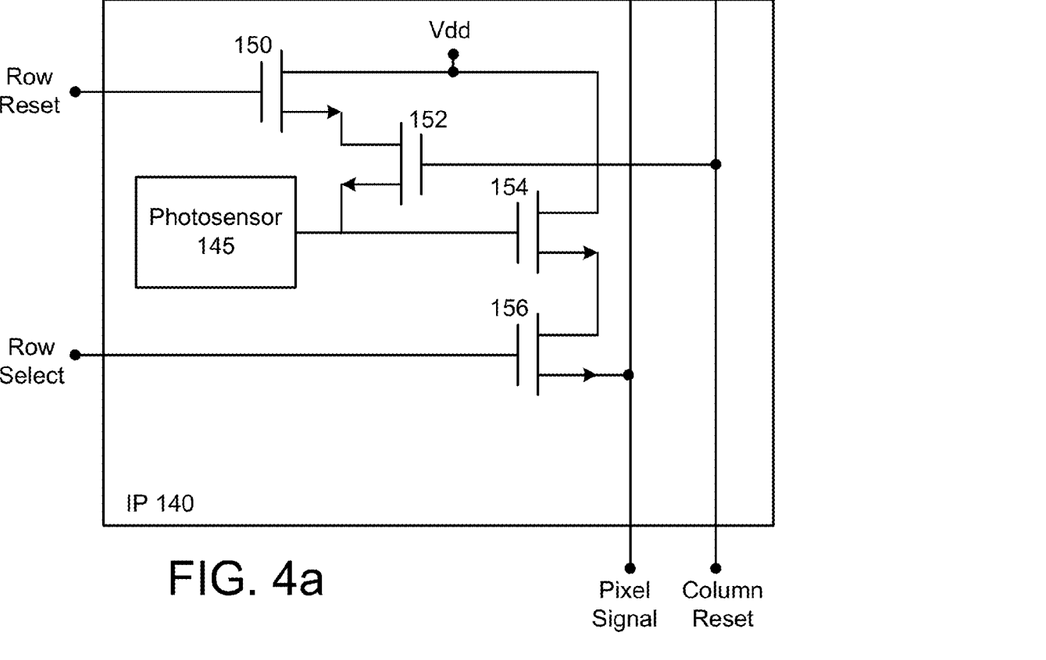
FIG. 4a illustrates example image pixel circuitry according to one embodiment.

FIG. 4a illustrates example image pixel circuitry according to one embodiment. The embodiment of FIG. 4a includes an IP 140 with two row lines, a row reset line and a row select line, and with two column lines, a pixel signal line and a column reset line. The IP includes a photosensor 145 that produces and stores charge in response to detecting light. The IP includes a reset circuit, comprising transistors 150 and 152, and a readout circuit, comprising transistors 154 and 156.

The IP 140 can output a pixel signal representing the light captured by the IP on the pixel signal line to a read circuit coupled to the pixel signal line. The photosensor 145 outputs a photosensor voltage representative of the charge stored at the photosensor to the gate node of the transistor 154. The drain node of the transistor 154 is coupled to a power supply supplying a voltage Vdd to the drain node. The transistor 154 operates as a source follower, and outputs a voltage, representative of the photosensor voltage, on the source node of the transistor 154, which is coupled to the drain node of the transistor 156. When a row select input is received on the row select line (which is coupled to the gate node of the transistor 156), the transistor 156 operates as a closed switch, and outputs a pixel signal representative of the source follower voltage to the pixel signal line coupled to the source node of the transistor 156. Thus, row select inputs on the row select line enable the outputting of pixel signals on the pixel signal line. Accordingly, "row select lines" and "row select inputs" are also referred to as "enable lines" and "enable inputs" herein.

The IP 140 can be reset by resetting or discharging the charge stored by the photosensor 145. A row reset input signal and a column reset input signal are concurrently received in order to reset the IP. The drain node of the transistor 150 is coupled to a power supply supplying a voltage Vdd to the drain node. Row reset input signals are received on the row reset line, which couples to the gate node of transistor 150. The transistor 150 acts as a closed switch when a row reset input signal is received. When the transistor 150 acts as a closed switch, a switched voltage representative of the voltage Vdd is output on the source node of the transistor 150, which in turn is coupled to the drain node of the transistor 152. Column reset input signals are received on the column reset line, which couples to the gate node of the transistor 152. In response to receiving a column reset input signal at the gate node of the transistor 152 while transistor 150 is activated, the transistor 152, acting as a closed switch, outputs a reset signal on the source node of the transistor 152 representative of the switched voltage received at the drain node of the transistor 152, resetting the photosensor 145.

Figure 4B:
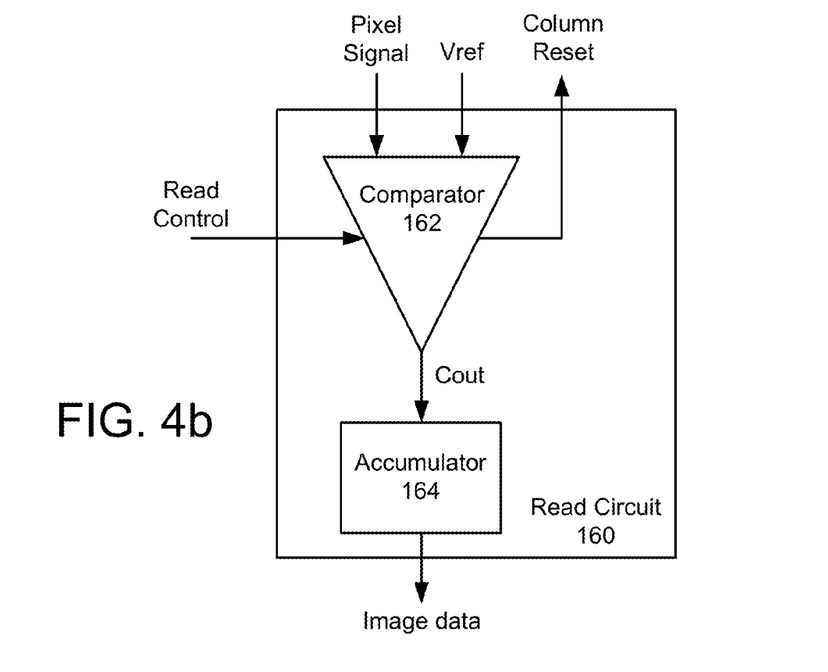
FIG. 4b illustrates an example read circuit according to one embodiment.

FIG. 4b illustrates an example read circuit according to one embodiment. The read circuit 160 includes a comparator 162 and an accumulator 164. The comparator includes a pixel signal input, a reference voltage input ("Vref"), a read control input, a "Cout" output, and a column reset output, and the accumulator includes an image data output. In one embodiment, the pixel signal input of the read circuit is coupled to the pixel signal line of the IP of the embodiment of FIG. 4a, and the column reset input of the read circuit is coupled to the column reset line of the IP of the embodiment of FIG. 4a. It should be noted that although not illustrated in the embodiment of FIG. 4b, the accumulator may also receive a read control input configured to enable the accumulator to accumulate received pixel signals, to output accumulated input pixel signals as image data, and/or to reset the accumulated pixel signals stored at the accumulator.

The comparator 162 receives reference voltage signals on the Vref input line and read control inputs on the read control input line, for instance from the control logic 132 of the embodiment of FIG. 3. The comparator also receives pixel signals on the pixel signal line, for instance from an IP associated with the read circuit 160. A received reference voltage signal can be a sampling threshold or an exposure threshold to which received pixel signals are compared. A received read control input enables a comparison between a received pixel signal and a reference voltage signal. If it is determined that a received pixel signal is greater than or equal to the reference voltage signal, the comparator outputs a digital value (either single or multibit, depending on the embodiment) on the Cout output for accumulation by the accumulator 164 and outputs a column reset signal on the column reset output. If it is determined that a received pixel signal is not greater than the reference voltage signal, the comparator does not output the pixel signal for accumulation by the accumulator and does not output a column reset signal.

Although not illustrated in the embodiment of FIG. 4b, it should be noted that the read circuit 160 may include an ADC configured to convert outputted pixel signals to multi-bit digital values representative of the pixel signals prior to accumulation by the accumulator 164, and that the ADC can also function as the comparator with Vref acting as a digital threshold value for comparison to the ADC output or partial output. It should also be noted that in embodiments where an IP associated with the read circuit is a BP, the comparator outputs a "1" on the Cout output if the pixel signal is greater than a reference voltage signal, and outputs a "0" if the pixel signal is less than a reference voltage signal. In such embodiments, the Cout and the column reset outputs can be the same output; outputted "1" values can be accumulated by the accumulator, and can be used as column reset signals to reset an IP associated with the read circuit.

In some embodiments the charge stored by the photosensor of the IP 140 of the embodiment of FIG. 4a is reset to a starting voltage, and decreases in response to each detected photon. In such embodiments, or other embodiments where the comparator receives a pixel signal that decreases for increasing charge accumulation at a pixel, the comparator 162 of the embodiment of FIG. 4b designated the threshold is passed if the received pixel signal is less than or equal to a received reference voltage signal. Such embodiments are not discussed further herein for the purposes of simplicity.

Image Sensor Architecture with Combination I/O Lines

In embodiments described further herein, for instance in the description of FIGS. 5a-5e, the image sensor region 125 of FIG. 3 communicatively couples to the read circuit array 130 via shared pixel signal/column reset combination lines. In such embodiments, each read circuit couples to an IP column via a bus including one or more combination lines such that each IP in the IP column is coupled to the read circuit via one or two pixel signal/column reset combination lines. In order to regulate the entity driving the combination line, multiplexing logic (not illustrated in FIG. 3) can be included between each IP column and an associated read circuit. The control logic 132 can control the selection of multiplexor lines in the multiplexing logic. For example, when an IP outputs a pixel signal to the read circuit, the control logic can couple the combination line to a pixel signal input on the read circuit. Similarly, when the read circuit produces a column reset signal for the IP (for instance, if it is determined that the received pixel signal exceeds a sampling threshold), the control logic can couple a column reset output of the read circuit to the combination line.

Figure 5A:
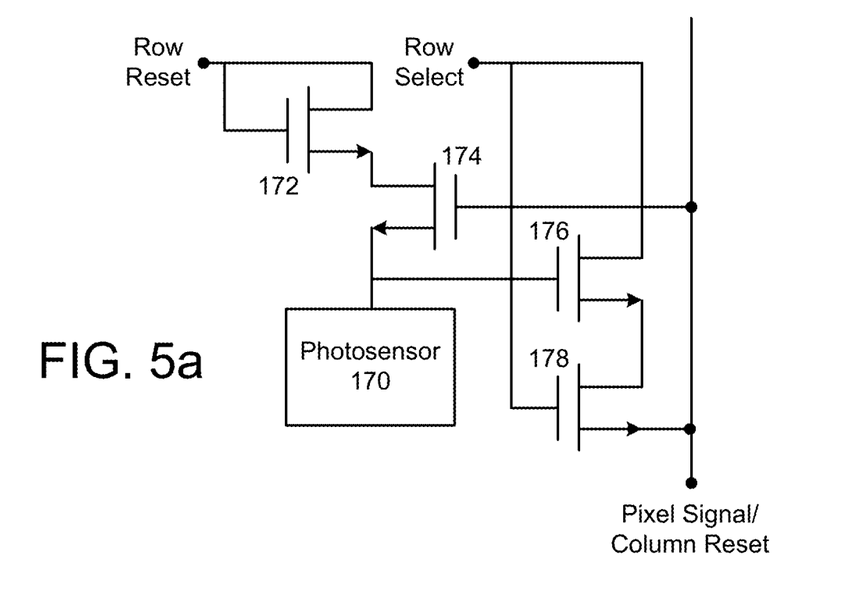
FIG. 5a illustrates image pixel circuitry with a combination input/output line according to a first embodiment.

FIG. 5a illustrates image pixel circuitry with a combination input/output line according to a first embodiment. The image pixel circuitry of FIG. 5a includes a reset circuit including transistors 172 and 174, and includes a readout circuit including transistors 176 and 178. The image pixel circuitry of FIG. 5a further includes a row reset input and a row select input (i.e., enable input) configured to receive row reset input signals and row select input signals, respectively. The image pixel circuitry also includes a pixel signal/column reset combination line (i.e., the combination input/output line) configured to output pixel signals and to receive column reset input signals.

The readout circuit of the image pixel circuitry of FIG. 5a can output a pixel signal representing the light captured by the photosensor 170. The photosensor outputs a photosensor voltage representative of the charge stored at the photosensor to the gate node of a transistor 176. The drain node of the transistor 176 is coupled to the row select input. When a row select input signal is received, the drain node of the transistor 176 goes high, and the transistor 176 acts as a source follower, outputting a voltage, representative of the photosensor voltage, on the source node of the transistor 176. The source follower output voltage is received at the drain node of the transistor 178, which is coupled to the source node of the transistor 178. The received row select input signal is also received at the gate node of the transistor 178, and the transistor 178, acting as a closed switch, outputs a pixel signal representative of the source follower output voltage to the pixel signal/column reset combination line.

The charge stored by the photosensor 170 can be reset or discharged upon the concurrent receipt by the reset circuit of the image pixel circuitry of FIG. 5a of a row reset signal and a column reset signal. When a row reset signal is received at the row reset input, the row reset signal is received by the gate node and the drain node of the transistor 172, and the transistor 172, acting as a closed switch, outputs a switched voltage signal on the source node of the transistor 172. When a column reset signal is received on the pixel signal/column reset combination line, the column reset signal is received at the gate node of the transistor 174. When a column reset signal is received concurrently with a row reset signal, the transistor 174, acting as a switch, outputs a reset signal on the source node of the transistor 174 representative of the switched voltage signal received at the drain node of the transistor 174, resetting the photosensor.

By coupling the row select line to the drain node of the transistor 176, row select inputs received on the row select line provide power to the readout circuit of the image pixel circuitry of FIG. 5a. Similarly, by coupling the row reset line to the drain node of the transistor 172, row reset inputs received on the row reset line provide power to the reset circuit of the image pixel circuitry of FIG. 5a. The use of received row select and row reset inputs to power the respective readout and reset circuits of the image pixel circuitry of FIG. 5a (and similarly, of the image pixel circuitry of FIGS. 5b, 5c, and 5e) beneficially reduces the need for a separate power bus in order to power the readout and reset circuits, thus reducing the number of lines required to couple to a given IP and potentially increases the fill factor of the IP.

Figure 5B:
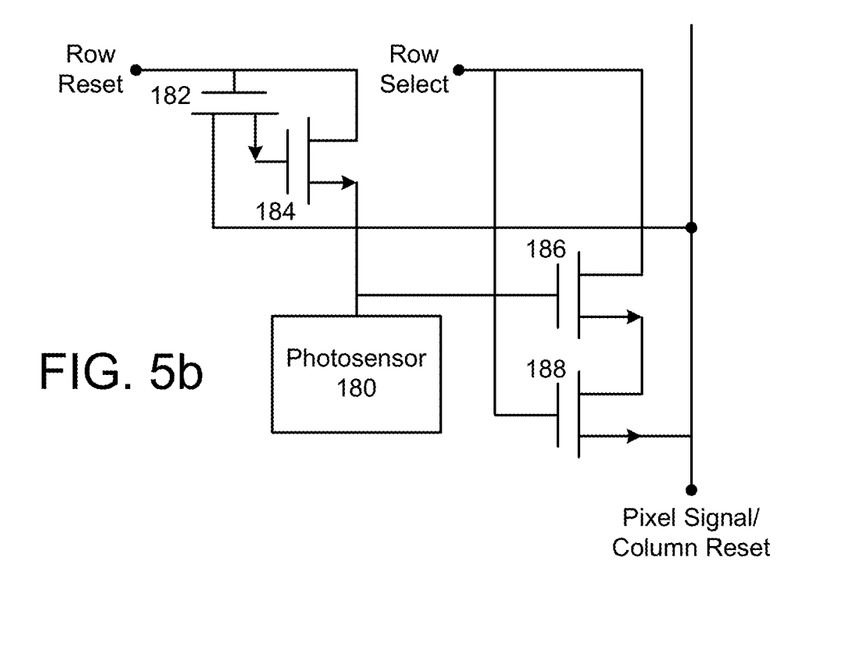
FIG. 5b illustrates image pixel circuitry with a combination input/output line according to a second embodiment.

FIG. 5b illustrates image pixel circuitry with a combination input/output line according to a second embodiment. Like the image pixel circuitry of FIG. 5a, the image pixel circuitry of FIG. 5b includes a reset circuit including transistors 182 and 184, includes a readout circuit including transistors 186 and 188, includes a row reset input and a row select input configured to receive row reset input signals and row select input signals, respectively, and includes a pixel signal/column reset combination line configured to output pixel signals and to receive column reset input signals.

The readout circuit of the image pixel circuitry of FIG. 5b operates similarly to the readout circuit of the image pixel circuitry of FIG. 5a. The photosensor 180 outputs a photosensor voltage representative of the charge stored at the photosensor to the gate node of a transistor 186. The drain node of the transistor 186 is coupled to the row select input. When a row select input signal is received, the drain node of the transistor 186 goes high, and the transistor 186 acts as a source follower, outputting a voltage, representative of the photosensor voltage, on the source node of the transistor 186. The source follower output voltage is received at the drain node of the transistor 188, which is coupled to the source node of the transistor 188. The received row select input signal is also received at the gate node of the transistor 188, causing the transistor 188, acting as a switch, to output a pixel signal representative of the source follower output voltage to the pixel signal/column reset combination line.

The charge stored by the photosensor 180 can be reset or discharged upon the concurrent receipt, by the reset circuit of the image pixel circuitry of FIG. 5b, of a row reset signal and a column reset signal. When a row reset signal is received at the row reset input, the row reset signal is received by the gate node of the transistor 182 and the drain node of the transistor 184. When a column reset signal is concurrently received on the pixel signal/column reset combination line, the column reset signal is received at the drain node of the transistor 182. In response, the transistor 182 outputs a voltage signal on the source node of the transistor 182 representative of the received column reset signal. The voltage signal is received at the gate node of the transistor 184, which is coupled to the source node of the transistor 182. The transistor 184 acts as a switch, and the voltage signal received at the gate node of the transistor 184 causes the transistor 184 to output a reset signal on the source node of the transistor 184 representative of the row reset signal received at the drain node of the transistor 184, resetting the photosensor.

In one embodiment, the drain node of the transistor 174 of the embodiment of FIG. 5a acts as a floating node, and can carry a floating charge. In such an embodiment, if the transistor 178 outputs a pixel signal on the pixel signal/column reset line of a high enough magnitude, the pixel signal received at the gate node of the transistor 174 (which is coupled to the pixel signal/column reset line) can cause the floating charge on the drain node of the transistor 174 to transfer to photosensor 170. In such an embodiment, the photosensor 170 can be disturbed despite never receiving concurrent row reset and column reset signals. In contrast, when the transistor 188 of the embodiment of FIG. 5b outputs a pixel signal on the pixel signal/column reset line, the pixel signal is received at the drain node of the transistor 182. The transistor 182 will not output a voltage representative of the pixel signal on the source node of the transistor 182 unless a row reset signal is received at the gate node of the transistor 182. The source node of the transistor 182 tends towards zero voltage when the transistor 182, acting as a switch, is open. Thus, the transistor 184, acting as a switch, is unlikely to prematurely disturb the photosensor 180.

Figure 5C:
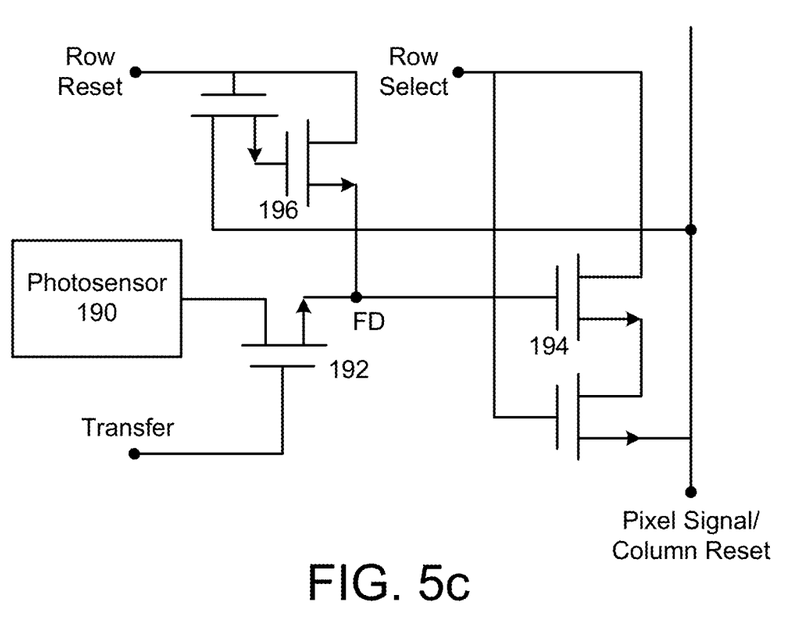
FIG. 5c illustrates image pixel circuitry with a combination input/output line according to a third embodiment.

FIG. 5c illustrates image pixel circuitry with a combination input/output line according to a third embodiment. The embodiment of FIG. 5c is similar to the embodiment of FIG. 5b, but additionally includes a transfer gate 192. The drain node of the transfer gate 192 is coupled to the photosensor 190, the gate node of the transfer gate 192 is coupled to a transfer input, and the source node of the transfer gate 192 is coupled to the source node of the transistor 196 to form a floating diffusion FD, which also couples to the gate node of the transistor 194. When a transfer input is received at the gate node of the transfer gate 192, the transfer gate 192 allows charge transfer between photosensor 190 and floating diffusion FD. The transfer input can be coupled to and controlled by, for example, the control logic 132 of the embodiment of FIG. 3. Although not illustrated in the embodiment of FIG. 5c, additional transfer gates can couple other photosensors to the reset circuit and the readout circuit of the image pixel circuitry of FIG. 5c, for instance one transfer gate per photodiode within the photosensor, allowing multiple such photosensors to share the reset and readout circuits. In such embodiments, each photodiode can be reset and/or perform a charge transfer to floating diffusion FD only if a transfer input signal is received at the transfer gate associated with that photodiode.

Figure 5D:
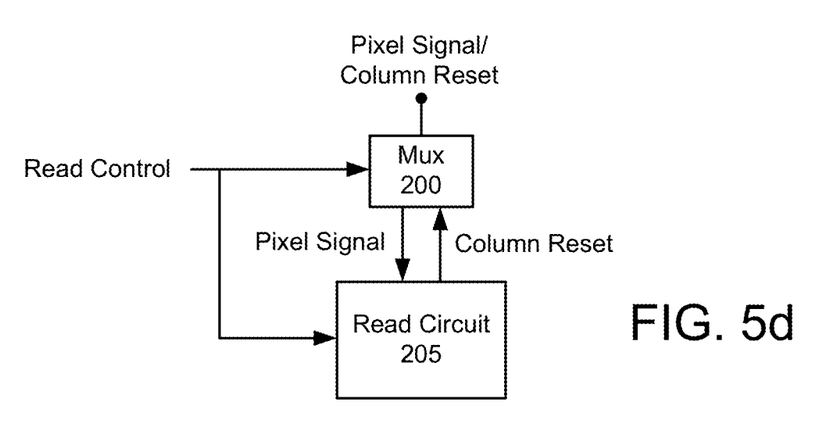
FIG. 5d illustrates an embodiment of a read circuit configured to interface with the image pixel circuitry of, for example, FIG. 5a, 5b, or 5c.

FIG. 5d illustrates an embodiment of a read circuit configured to interface with the image pixel circuitry of, for example, FIG. 5a, 5b, or 5c. In the embodiment of FIG. 5d, a multiplexor ("mux") 200 is coupled to a read circuit 205. The mux is coupled to a pixel signal/column reset line, which in turn can be coupled to the image pixel circuitry of an IP. The mux also includes a read control input, a column reset input, and a pixel signal output. The mux receives read control signals from, for example, the control logic 132 of the embodiment of FIG. 3. The read control signals act as a select signal for the mux. For example, a first read control signal (such as a digital "0" value) can couple the pixel signal/column reset line to the pixel signal output, routing pixel signals received on the pixel signal/column reset line to the pixel signal output. Similarly, a second read control signal (such as a digital "1" value) can couple the pixel signal/column reset line to the column reset input, routing column reset signals received on the column reset input to the pixel signal/column reset line. Alternately, the pixel signal/column reset line can be directly and continuously coupled to the pixel signal output, and the read control signal selectively couples the column reset input to the pixel signal/column reset line. The read circuit includes a pixel signal input, a read control input, and a column reset output. As described above, the read circuit receives pixel signals on the pixel signal input, and produces and outputs column reset signals on the column reset output when enabled by a read control signal received on the read control input.

Figure 5E:
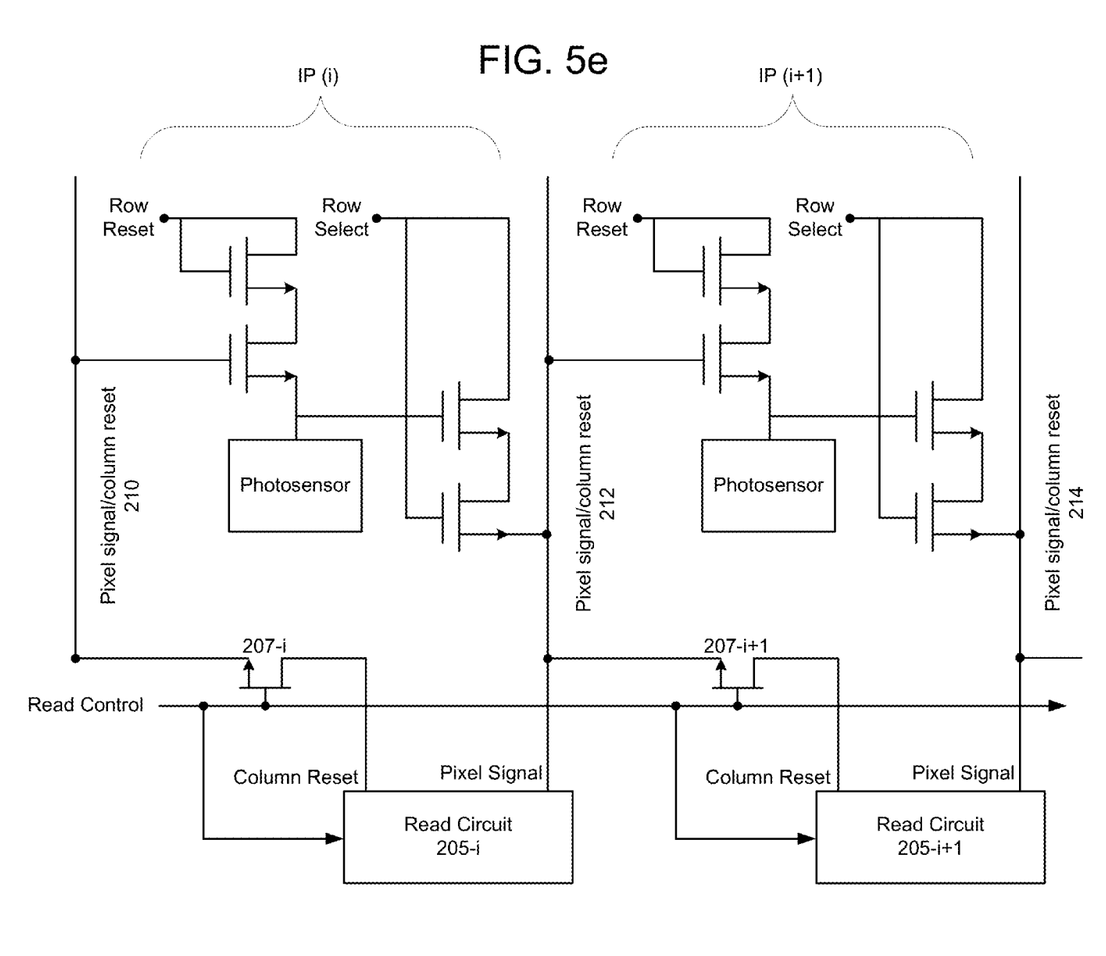
FIG. 5e illustrates image pixel circuitry with combination input/output lines shared between image pixels, according to one embodiment.

FIG. 5e illustrates image pixel circuitry with combination input/output lines shared between image pixels, according to one embodiment. The embodiment of FIG. 5e includes two image pixel circuits, IP(i) and IP(i+1) and two read circuits 205-*i* and 205-*i*+1. The image pixel circuits of the embodiment of FIG. 5e are similar to the image pixel circuits of the embodiment of FIG. 5a. However, each image pixel circuit in the embodiment of FIG. 5e receives column reset signals from and outputs pixel signals to different combination input/output lines. For example, IP(i) receives column reset signals from the pixel signal/column reset 210 combination line and outputs pixel signals to the pixel signal/column reset 212 combination line. Similarly, IP(i+1) receives column reset signals from the pixel signal/column reset 212 combination line and outputs pixel signals to the pixel signal/column reset 214 combination line. Each read circuit receives a pixel signal on one pixel signal/column reset line and drives a column reset signal on the next pixel signal/column reset line to the left of the first. For instance, read circuit 205-*i* receives a pixel signal on pixel signal/column reset line 212. When a read control signal is asserted, read circuit 205-*i* drives a column reset signal (which can be either high or low) through a mux transistor 207-*i* coupled to pixel signal/column reset line 210. At the same time, read circuit 205-*i*+1 can drive a column reset signal through a mux transistor 207-*i*+1 coupled to pixel signal/column reset line 212. Such an architecture may improve the fill factor of an image sensor region and/or the layout of the read circuits and multiplexers.

Figure 6A:
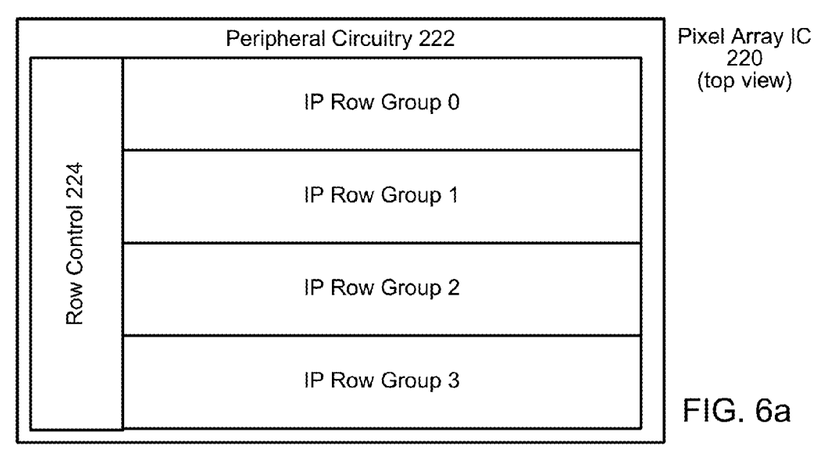
FIG. 6a illustrates a top view of a pixel array IC in an example two-layer image sensor system architecture according to one embodiment using, e.g., the image pixel circuitry of FIGS. 5a, 5b, 5c, and 5e.

FIG. 6a illustrates a top view of a pixel array IC 220 in an example two-layer image sensor system architecture according to one embodiment using, e.g., the image pixel circuitry of FIGS. 5a, 5b, 5c, and 5e. The pixel array IC of FIG. 6a includes peripheral circuitry 222 surrounding an IP array. The IP array includes row control circuitry 224 and four row groups of IPs (IP Row Groups 0 through 3). Each IP row group is the width of the array and includes one-fourth of the rows in the array, and the row control circuitry provides control and reset signals needed for operation of the IPs (for instance, signals configured to cause the IPs to be reset, selected for readout, and any other signals discussed herein).

Figure 6B:
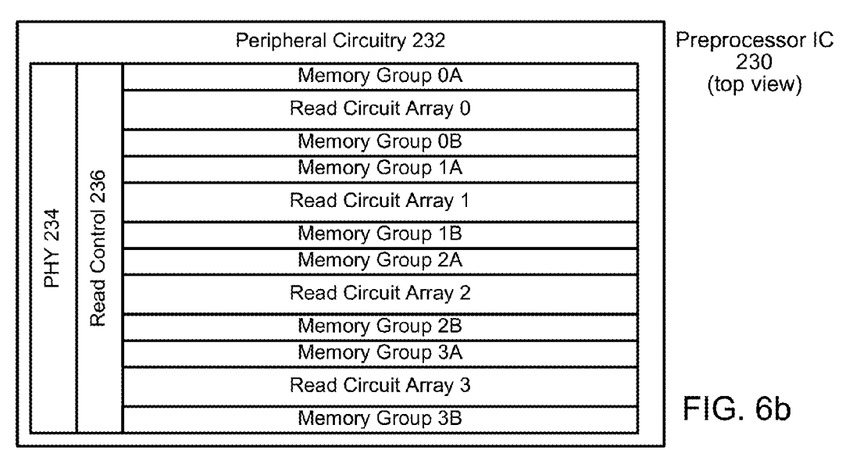
FIG. 6b illustrates a top view of a preprocessor IC in an example two-layer image sensor system architecture according to one embodiment using, e.g., the read circuitry of FIG. 5d.

FIG. 6b illustrates a top view of a preprocessor IC 230 in an example two-layer image sensor system architecture according to one embodiment using, e.g., the read circuitry of FIG. 5d. The preprocessor IC of FIG. 6b includes peripheral circuitry 232 surrounding a read circuit array. The read circuit array includes a physical signaling interface 234 (which may alternately be on pixel array IC 220), read control circuitry 236, four read circuit arrays (read circuit array 0 through 3), and accompanying memory groups 0A/B, 1A/B, 2A/B, and 3A/B. Each read circuit array includes one or more read circuits (including an ADC, comparator, accumulator, and the like) connected to corresponding rows in an associated memory group. When a particular IP row is selected in an IP row group of the pixel array IC, a corresponding row in the corresponding memory group is selected on the preprocessor IC.

Figure 6C:
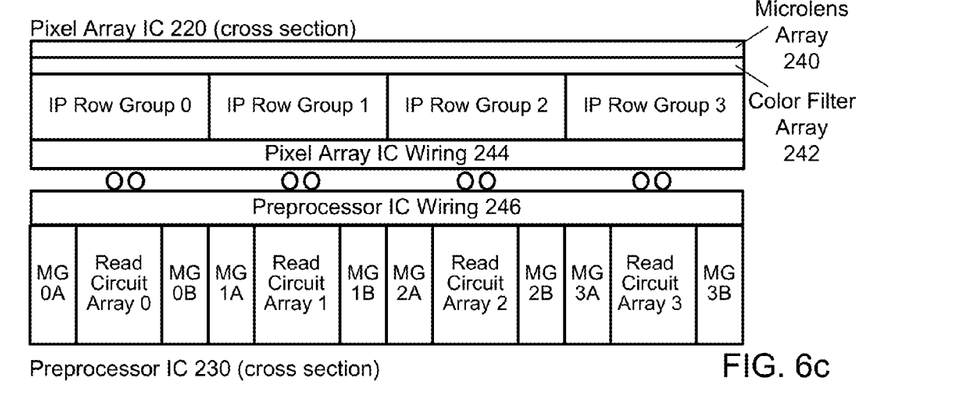
FIG. 6c illustrates a partial cross section of the pixel array IC of FIG. 6a and the preprocessor IC of FIG. 6b in an example two-layer image sensor system architecture, according to one embodiment.

FIG. 6c illustrates a partial cross section of the pixel array IC of FIG. 6a and the preprocessor IC of FIG. 6b in an example two-layer image sensor system architecture, according to one embodiment. In the embodiment of FIG. 6c, the pixel array IC 220 is located above the preprocessor IC 230 such that the bottom surface of the pixel array IC is coupled to the top surface of the preprocessor IC. A microlens array 240 and a color filter array 242 are located above the pixel array IC. The pixel array IC and the processor IC are coupled via pixel array IC wiring 244 and preprocessor IC wiring 246. By locating the pixel array IC above the preprocessor IC, the fill factor of the image sensor system is increased. For instance, in a single-layer IC architecture including an IP array and one or more read circuit arrays, the portion of the single-layer IC including the one or more read circuit arrays are incapable of capturing light; such an embodiment reduces the amount of light incident upon the single-layer IC that is captured for a given circuit size, or for the same light capture requires a larger chip to allow the read circuits and memory to be arranged in the periphery. The top-layer of the embodiment of FIG. 6c, in contrast, does not include read circuit arrays, increasing the amount of the top-layer including the IP array, and accordingly increasing the amount of light incident upon the top layer that is captured. Combining pixel signal lines and column reset lines into combination lines further reduces the amount of surface area within the pixel array IC incapable of capturing light, and increasing the fill factor of the image sensor system. Light incident upon the top-layer passes through the microlens array and the color filter array, is captured by the IPs in the IP array, and signals representative of the captured light are sampled by the read circuit arrays via the pixel array IC wiring and the preprocessor IC wiring.

Additional Considerations

It should be noted that the various circuits disclosed herein can be described using computer aided design tools and expressed (or represented), as data and/or instructions embodied in various computer-readable media, in terms of their behavioral, register transfer, logic component, transistor, layout geometries, and/or other characteristics. Formats of files and other objects in which such circuit expressions can be implemented include, but are not limited to, formats supporting behavioral languages such as C, Verilog, and VHDL, formats supporting register level description languages like RTL, and formats supporting geometry description languages such as GDSII, GDSIII, GDSIV, CIF, MEBES and any other suitable formats and languages. Computer-readable media in which such formatted data and/or instructions can be embodied include, but are not limited to, computer storage media in various forms (e.g., optical, magnetic or semiconductor storage media, whether independently distributed in that manner, or stored "in situ" in an operating system).

When received within a computer system via one or more computer-readable media, such data and/or instruction-based expressions of the above described circuits can be processed by a processing entity (e.g., one or more processors) within the computer system in conjunction with execution of one or more other computer programs including, without limitation, net-list generation programs, place and route programs and the like, to generate a representation or image of a physical manifestation of such circuits. Such representation or image can thereafter be used in device fabrication, for example, by enabling generation of one or more masks that are used to form various components of the circuits in a device fabrication process.

In the foregoing description and in the accompanying drawings, specific terminology and drawing symbols have been set forth to provide a thorough understanding of the disclosed embodiments. In some instances, the terminology and symbols may imply specific details that are not required to practice those embodiments. For example, any of the specific numbers of bits, signal path widths, signaling or operating frequencies, component circuits or devices and the like can be different from those described above in alternative embodiments. Additionally, links or other interconnection between integrated circuit devices or internal circuit elements or blocks may be shown as buses or as single signal lines. Each of the buses can alternatively be a single signal line, and each of the single signal lines can alternatively be buses. Signals and signaling links, however shown or described, can be single-ended or differential. A signal driving circuit is said to "output" a signal to a signal receiving circuit when the signal driving circuit asserts (or de-asserts, if explicitly stated or indicated by context) the signal on a signal line coupled between the signal driving and signal receiving circuits. The term "coupled" is used herein to express a direct connection as well as a connection through one or more intervening circuits or structures. Integrated circuit device "programming" can include, for example and without limitation, loading a control value into a register or other storage circuit within the integrated circuit device in response to a host instruction (and thus controlling an operational aspect of the device and/or establishing a device configuration) or through a one-time programming operation (e.g., blowing fuses within a configuration circuit during device production), and/or connecting one or more selected pins or other contact structures of the device to reference voltage lines (also referred to as strapping) to establish a particular device configuration or operation aspect of the device. The term "light" as used to apply to radiation is not limited to visible light, and when used to describe sensor function is intended to apply to the wavelength band or bands to which a particular pixel construction (including any corresponding filters) is sensitive. The terms "exemplary" and "embodiment" are used to express an example, not a preference or requirement. Also, the terms "may" and "can" are used interchangeably to denote optional (permissible) subject matter. The absence of either term should not be construed as meaning that a given feature or technique is required.

The section headings in the above detailed description have been provided for convenience of reference only and in no way define, limit, construe or describe the scope or extent of the corresponding sections or any of the embodiments presented herein. Also, various modifications and changes can be made to the embodiments presented herein without departing from the broader spirit and scope of the disclosure. For example, features or aspects of any of the embodiments can be applied, at least where practicable, in combination with any other of the embodiments or in place of counterpart features or aspects thereof. Accordingly, the specification and drawings are to be regarded in an illustrative rather than a restrictive sense.

What is claimed is:

1. An integrated-circuit image sensor comprising:
    a pixel region, the pixel region configured to detect light and comprising a readout circuit to produce a pixel signal in response to detected light and a reset circuit for resetting the pixel signal;
    a combination input/output line coupled to the readout circuit and to the reset circuit;
    a reset line coupled to the reset circuit, the reset circuit configured to reset the pixel signal in response to concurrently receiving a first reset signal on the reset line and a second reset signal on the combination input/output line; and
    an enable line coupled to the readout circuit, the readout circuit configured to output the pixel signal on the first combination input/output line in response to receiving an enable signal on the enable line.

2. The integrated-circuit image sensor of claim 1, wherein the combination input/output line couples to a second reset circuit of a first adjacent pixel region, and wherein the combination input/output line couples to a second readout circuit of a second adjacent pixel region.

3. The integrated-circuit image sensor of claim 1, wherein the readout circuit comprises a source follower amplifier configured to access a charge generated by the pixel region and to output a pixel signal representative of the accessed charge.

4. The integrated-circuit image sensor of claim 1, wherein the pixel region further comprises a photodiode configured to detect light.

5. The integrated-circuit image sensor of claim 4, wherein the photodiode couples to the readout circuit and the reset circuit via a transfer gate.

6. The integrated-circuit image sensor of claim 5, wherein resetting the pixel signal comprises resetting a charge generated by the photodiode.

7. The integrated-circuit image sensor of claim 1, wherein the pixel region further comprises a first photodiode and a second photodiode coupled to the readout circuit and the reset circuit via a respective first transfer gate and second transfer gate.

8. The integrated-circuit image sensor of claim 7, wherein the first photodiode is reset upon concurrently receiving a first reset signal on the reset line, receiving a second reset signal on the combination input/output line, and operating the first transfer gate as a closed switch.

9. The integrated-circuit image sensor of claim 7, wherein the second photodiode is reset upon concurrently receiving a first reset signal on the reset line, receiving a second reset signal on the combination input/output line, and operating the second transfer gate as a closed switch.

10. The integrated-circuit image sensor of claim 1, wherein the second photodiode is reset upon concurrently receiving a first reset signal on the reset line, receiving a second reset signal on the combination input/output line, and operating the second transfer gate as a closed switch.

11. The integrated-circuit image sensor of claim 1, wherein enable signals received on the enable line are further configured to provide power to the readout circuit and wherein reset signals received on the reset line are further configured to provide power to the reset circuit.

12. The integrated-circuit image sensor of claim 1, wherein the reset line comprises a row reset line coupled to a plurality of pixel regions.

13. The integrated-circuit image sensor of claim 1, wherein the combination input/output line comprises a column combination input/output line coupled to a plurality of pixel regions.

14. The integrated-circuit image sensor of claim 1, further comprising:
    a read circuit coupled to the combination input/output line and configured to:
        receive the pixel signal on the combination input/output line; and
        responsive to the pixel signal exceeding a sampling threshold:
            produce a digital pixel output value indicating a non-zero reading; and
            produce a reset signal for the reset circuit on the combination input/output line.

15. An integrated-circuit image sensor comprising:
    a pixel region, the pixel region configured to detect light and comprising a readout circuit to produce a pixel signal in response to detected light and a reset circuit for resetting the pixel signal;
    a combination input/output line coupled to the readout circuit and the reset circuit;
    a reset line coupled to the reset circuit, the reset circuit configured to reset the pixel signal in response to concurrently receiving a first reset signal on the reset line and a second reset signal on the combination input/output line; and
    an enable line coupled to the readout circuit, the readout circuit configured to output the pixel signal on the combination input/output line in response to receiving an enable signal on the enable line.

16. The integrated-circuit image sensor of claim 15, wherein the pixel region comprises a photosensor configured to detect light and to store charge responsive to the detected light, and wherein the pixel signal is produced by the readout circuit responsive to the stored charge.

17. The integrated-circuit image sensor of claim 16, wherein the photosensor couples to the readout circuit and the reset circuit via a transfer gate.

18. The integrated-circuit image sensor of claim 17, wherein resetting the pixel signal comprises resetting the charge stored by the photosensor.

19. An integrated-circuit image sensor comprising:
    an array of image pixels, each image pixel comprising:
        a pixel region, the pixel region configured to detect light and comprising a readout circuit to produce a pixel signal in response to detected light and a reset circuit for resetting the pixel signal;
        a combination input/output line coupled to the readout circuit and the reset circuit;
        a reset line coupled to the reset circuit, the reset circuit configured to reset the pixel signal in response to concurrently receiving a first reset signal on the reset line and a second reset signal on the combination input/output line; and an enable line coupled to the readout circuit, the readout circuit configured to output the pixel signal on the combination input/output line in response to receiving an enable signal on the enable line;

an array of read circuits, each read circuit coupled to one or more associated image pixels via the combination input/output line of each of the associated image pixels and configured to:

receive a pixel signal from an image pixel via the combination input/output line; and responsive to the pixel signal exceeding a sampling threshold:

produce a digital pixel output value indicating a non-zero reading; and produce a reset signal for the image pixel on the combination input/output line; and control logic coupled to the reset line and the enable line of each image pixel, and configured to:

produce enable signals on the enable line of each image pixel; and produce reset signals on the reset line of each image pixel.

\* \* \* \* \*